US010351170B2

(12) United States Patent
Gordon

(10) Patent No.: US 10,351,170 B2
(45) Date of Patent: Jul. 16, 2019

(54) ROD-END SUSPENSION ARM

(71) Applicant: Robby Gordon, Charlotte, NC (US)

(72) Inventor: Robby Gordon, Charlotte, NC (US)

(*) Notice: Subject to any disclaimer, the term of this patent is extended or adjusted under 35 U.S.C. 154(b) by 0 days.

(21) Appl. No.: 15/937,660

(22) Filed: Mar. 27, 2018

(65) Prior Publication Data
US 2018/0281540 A1    Oct. 4, 2018

Related U.S. Application Data

(63) Continuation of application No. 15/625,692, filed on Jun. 16, 2017.
(Continued)

(51) Int. Cl.
*B62D 7/22* (2006.01)
*B60G 7/00* (2006.01)
(Continued)

(52) U.S. Cl.
CPC ............ *B62D 7/22* (2013.01); *B60B 3/16* (2013.01); *B60B 27/0052* (2013.01); *B60B 35/128* (2013.01); *B60G 3/14* (2013.01); *B60G 3/20* (2013.01); *B60G 7/001* (2013.01); *B60G 7/005* (2013.01); *B60G 7/008* (2013.01); *B60G 7/02* (2013.01); *B60G 15/063* (2013.01); *B60K 17/16* (2013.01); *B60K 17/306* (2013.01); *B60R 19/54* (2013.01); *B62D 3/02* (2013.01); *B62D 7/16* (2013.01); *B62D 7/166* (2013.01); *B62D 7/20* (2013.01); *B62D 21/11* (2013.01); *B62D 21/12* (2013.01); *B62D 23/005* (2013.01); *B62D 27/023* (2013.01); *F16C 7/02* (2013.01);
(Continued)

(58) Field of Classification Search
CPC ......... B60G 7/008; B60G 7/005; B60G 3/20; B60G 7/001; B60G 2200/44; B60G 2206/72; B60G 2206/73; B60G 2300/07; B60G 2204/148; B60G 2206/84; B60G 2200/14; B62D 7/20
See application file for complete search history.

(56) References Cited

U.S. PATENT DOCUMENTS 3,467,406 A * 9/1969 Henry-Biabaud ....... B60G 3/20
267/257
5,372,373 A * 12/1994 Reel .......................... B60G 7/02
280/124.111
(Continued)

*Primary Examiner* — Darlene P Condra
(74) *Attorney, Agent, or Firm* — Rutan & Tucker LLP; Hani Z. Sayed

(57) ABSTRACT

A rod-end front suspension is provided for an off-road vehicle. The rod-end front suspension comprises a spindle assembly that is pivotally coupled with an upper suspension arm by way of a first rod-end joint and pivotally coupled with a lower suspension arm by way of a second rod-end joint. A steering rod-end joint coupled with the spindle assembly pivotally receives a steering rod. An axle assembly coupled with the spindle assembly conducts torque from a transaxle to a wheel coupled with the spindle assembly. Each of the first and second rod-end joints comprises a ball rotatably retained within a casing. The ball is fastened within a recess between parallel prongs extending from the spindle assembly. A threaded shank extending from the casing is threadably fixated with the suspension arm, such that the spindle assembly may be moved with respect to the casing and the suspension arm.

18 Claims, 8 Drawing Sheets

Related U.S. Application Data

(60) Provisional application No. 62/480,960, filed on Apr. 3, 2017.

(51) Int. Cl.

| | | |
|---|---|---|
| *B60G 7/02* | (2006.01) | |
| *B60G 15/06* | (2006.01) | |
| *B62D 7/20* | (2006.01) | |
| *B60K 17/30* | (2006.01) | |
| *B60G 3/20* | (2006.01) | |
| *B62D 7/16* | (2006.01) | |
| *F16C 11/06* | (2006.01) | |
| *B60B 3/16* | (2006.01) | |
| *B60B 27/00* | (2006.01) | |
| *B60B 35/12* | (2006.01) | |
| *B60G 3/14* | (2006.01) | |
| *F16D 3/30* | (2006.01) | |
| *B60K 17/16* | (2006.01) | |
| *B60R 19/54* | (2006.01) | |
| *B62D 3/02* | (2006.01) | |
| *B62D 21/11* | (2006.01) | |
| *B62D 21/12* | (2006.01) | |
| *B62D 23/00* | (2006.01) | |
| *B62D 27/02* | (2006.01) | |
| *F16C 7/02* | (2006.01) | |
| *B62D 7/18* | (2006.01) | |
| *F16D 1/10* | (2006.01) | |

(52) U.S. Cl.
CPC ............ *F16C 11/0695* (2013.01); *F16D 3/30* (2013.01); *B60G 2200/14* (2013.01); *B60G 2200/144* (2013.01); *B60G 2200/156* (2013.01); *B60G 2200/44* (2013.01); *B60G 2202/312* (2013.01); *B60G 2204/129* (2013.01); *B60G 2204/143* (2013.01); *B60G 2204/148* (2013.01); *B60G 2204/416* (2013.01); *B60G 2206/11* (2013.01); *B60G 2206/12* (2013.01); *B60G 2206/50* (2013.01); *B60G 2206/72* (2013.01); *B60G 2206/73* (2013.01); *B60G 2206/84* (2013.01); *B60G 2300/07* (2013.01); *B62D 7/18* (2013.01); *F16C 2326/24* (2013.01); *F16D 2001/103* (2013.01)

(56) References Cited

U.S. PATENT DOCUMENTS

| | | | | |
|---|---|---|---|---|
| 5,782,484 | A * | 7/1998 | Kuhn, Jr. | B60G 3/265 267/248 |
| 6,431,569 | B2 * | 8/2002 | Handa | B60G 3/20 280/124.138 |
| 6,520,682 | B2 * | 2/2003 | Kletzli | A01B 59/008 384/192 |
| 6,988,830 | B2 * | 1/2006 | Maasch | F16C 23/045 384/206 |
| 7,223,019 | B2 * | 5/2007 | Hoppe | F04B 1/2071 384/192 |
| 8,337,087 | B2 * | 12/2012 | Blachon | F16C 11/0614 384/192 |
| 2015/0251512 | A1 * | 9/2015 | Karpman | B60G 7/005 403/122 |
| 2015/0343900 | A1 * | 12/2015 | Schlangen | B60G 3/20 180/247 |

* cited by examiner

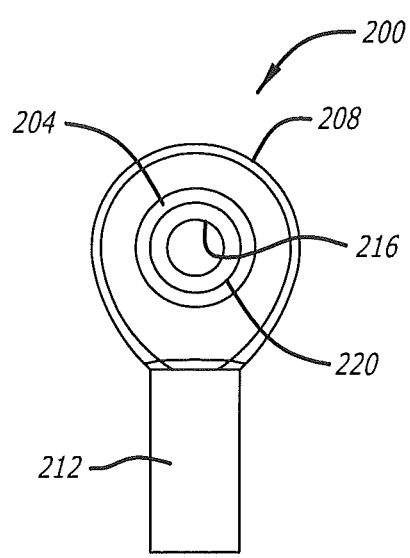
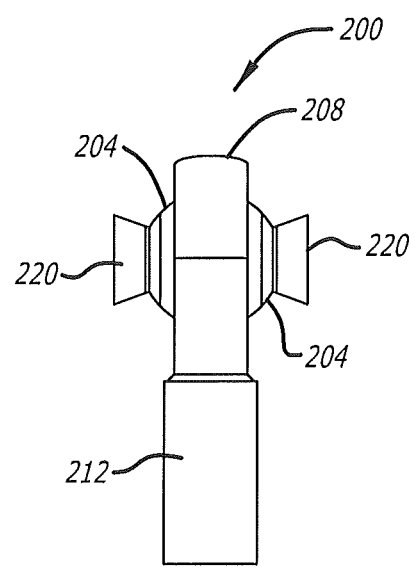
FIG. 4A                FIG. 4B
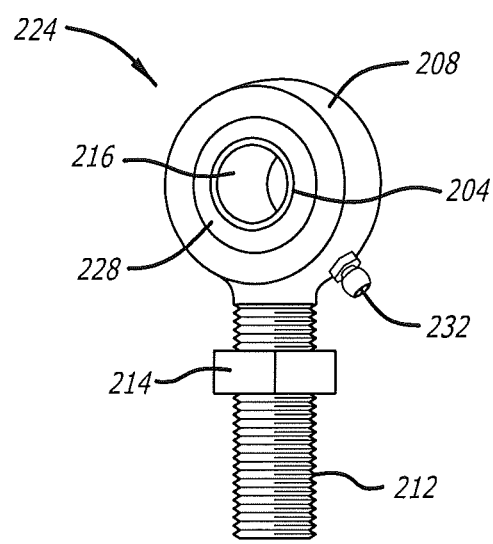
FIG. 5

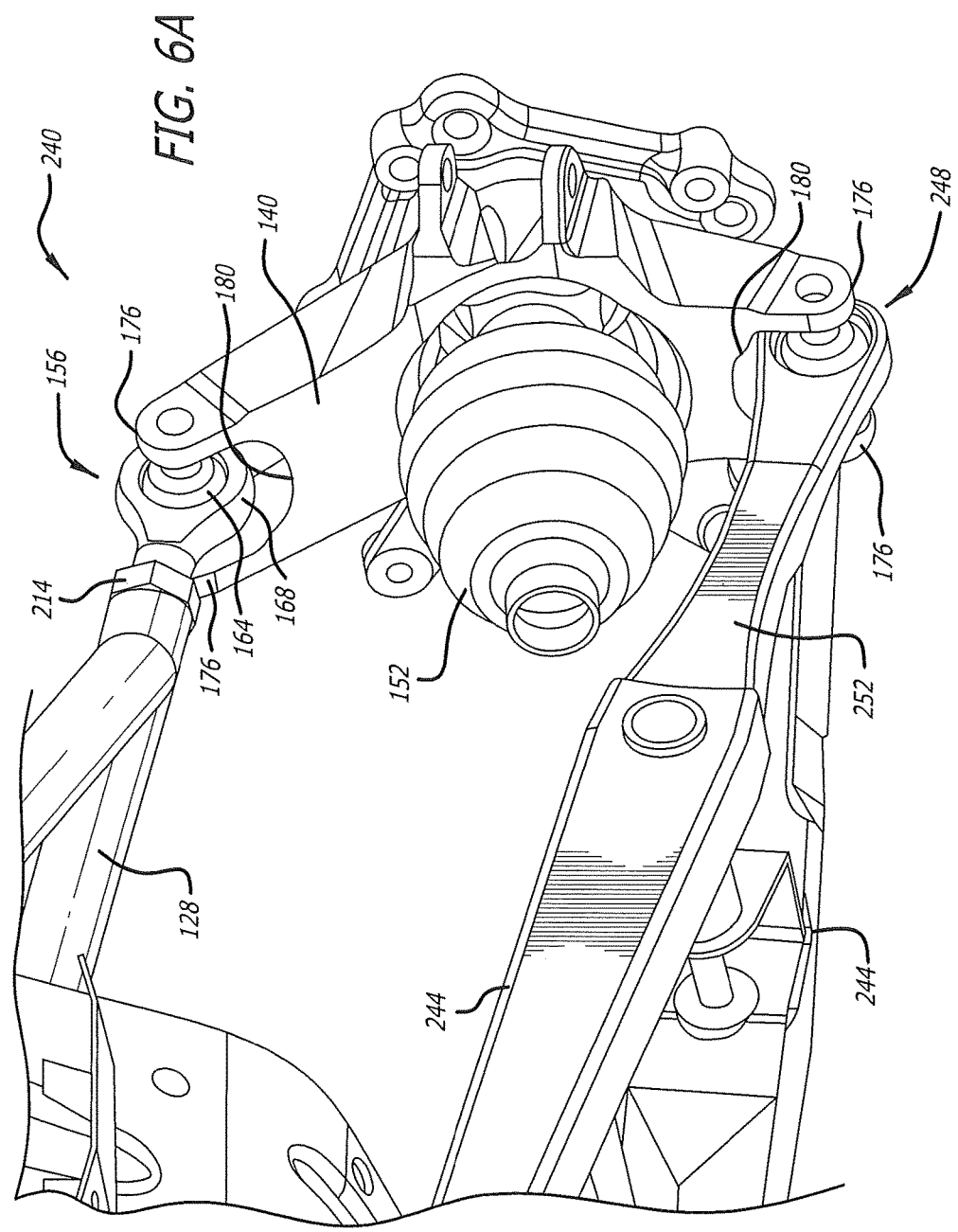

ROD-END SUSPENSION ARM

PRIORITY

This application is a continuation-in-part of, and claims the benefit of, U.S. Patent Application, entitled "Rod-End Front Suspension," filed on Jun. 16, 2017, and having application Ser. No. 15/625,692, which claims the benefit of, and priority to, U.S. Provisional Application, entitled "Off-Road Front Suspension System," filed on Apr. 3, 2017 and having application Ser. No. 62/480,960, the entirety of each of said applications being incorporated herein by reference.

FIELD

The field of the present disclosure generally relates to vehicle suspension systems. More particularly, the field of the invention relates to an off-road front suspension system configured to improve the mechanical strength and performance of off-road drivetrains.

BACKGROUND

A double wishbone suspension is a well-known independent suspension design using upper and lower wishbone-shaped arms to operably couple a front wheel of a vehicle. Typically, the upper and lower wishbones or suspension arms each has two mounting points to a chassis of the vehicle and one mounting joint at a spindle assembly or knuckle. A shock absorber and a coil spring may be mounted onto the wishbone to control vertical movement of the front wheel. The double wishbone suspension facilitates control of wheel motion throughout suspension travel, including controlling such parameters as camber angle, caster angle, toe pattern, roll center height, scrub radius, scuff, and the like.

Double wishbone suspensions may be used in a wide variety of vehicles, including heavy-duty vehicles, as well as many off-road vehicles, as shown in FIG. 1. FIG. 1 shows an off-road vehicle 100 that is of a Side by Side variety. The Side by Side is a four-wheel drive off-road vehicle that typically seats between two and six occupants, and is sometimes referred to as a Utility Task Vehicle (UTV), a Recreational Off-Highway Vehicle (ROV), or a Multipurpose Off-Highway Utility Vehicle (MOHUV). In addition to the side-by-side seating arrangement, many UTVs have seat belts and roll-over protection, and some may have a cargo box at the rear of the vehicle. A majority of UTVs come factory equipped with hard tops, windshields, and cab enclosures.

The double-wishbone suspension often is referred to as "double A-arms", although the arms may be A-shaped, L-shaped, J-shaped, or even a single bar linkage. In some embodiments, the upper arm may be shorter than the lower arm so as to induce negative camber as the suspension jounces (rises). Preferably, during turning of the vehicle, body roll imparts positive camber gain to the lightly loaded inside wheel, while the heavily loaded outer wheel gains negative camber.

The spindle assembly, or knuckle, is coupled between the outboard ends of the upper and lower suspension arms. In some designs, the knuckle contains a kingpin that facilitates horizontal radial movement of the wheel, and rubber or trunnion bushings for vertical hinged movement of the wheel. In some relatively newer designs, a ball joint may be disposed at each outboard end to allow for vertical and radial movement of the wheel. A bearing hub, or a spindle to which wheel bearings may be mounted, may be coupled with the center of the knuckle.

Constant velocity (CV) joints allow pivoting of the suspension arms and the spindle assembly, while a drive shaft coupled to the CV joint delivers power to the wheels. Although CV joints are typically used in front wheel drive vehicles, off-road vehicles such as four-wheeled buggies comprise CV joints at all wheels. Constant velocity joints typically are protected by a rubber boot and filled with molybdenum disulfide grease.

Given that off-road vehicles routinely travel over very rough terrain, such as mountainous regions, there is a desire to improve the mechanical strength and performance of off-road drivetrain and suspension systems, while at the same reducing the mechanical complexity of such systems.

SUMMARY

An apparatus for a rod-end front suspension is provided for an off-road vehicle. The rod-end front suspension comprises a spindle assembly that is pivotally coupled with an upper suspension arm by way of a first rod-end joint and pivotally coupled with a lower suspension arm by way of a second rod-end joint. A steering rod-end joint coupled with the spindle assembly is configured to pivotally receive a steering rod. An axle assembly coupled with the spindle assembly is configured to conduct torque from a transaxle to a wheel coupled with the spindle assembly. The first and second rod-end joints each comprises a ball rotatably retained within a casing. A bore extends through the ball and is configured to receive a bolt that fastens the ball within a recess between parallel prongs extending from the spindle assembly. A threaded shank extending from the casing may be threadably fixated with the suspension arm, such that the spindle assembly may be moved with respect to the casing and the suspension atm. In some embodiments, the first and second rod-end joints may be self-lubricating and may include a lubricating race that is disposed between the ball and an interior of the casing.

In an exemplary embodiment, a spindle assembly for a front suspension of an off-road vehicle comprises a first rod-end joint configured to pivotally receive an upper suspension arm; a second rod-end joint configured to pivotally receive a lower suspension arm; a steering rod-end joint configured to pivotally receive a steering rod; and an axle assembly configured to conduct torque from a transaxle to a wheel coupled with the spindle assembly.

In another exemplary embodiment, at least one of the first rod-end joint and the second rod-end joint is disposed within a recess between parallel prongs extending from the spindle assembly, a ball comprising the at least one of the first rod-end joint and the second rod-end joint being fixated between the parallel prongs by way of a bolt, such that a casing comprising the at least one of the first rod-end joint and the second rod-end joint may undergo an advantageous degree of movement on the ball. In another exemplary embodiment, the recess between the parallel prongs is configured to have a shape and a size that are suitable to fixate the ball and allow the advantageous degree of movement of the casing on the ball. In another exemplary embodiment, at least one of the first rod-end joint and the second rod-end joint comprises a ball rotatably retained within a casing; a bore extending through the ball and configured to receive a bolt that is configured to fixate the ball between parallel prongs of the spindle assembly; a threaded shank fixedly coupled with the casing and configured to be received by a suspension arm; and a misalignment spacer disposed on each of opposite sides of the ball and configured to provide clearance for rotation of the casing on the ball.

In another exemplary embodiment, a weld-in tube end is coupled with the casing in lieu of the threaded shank and configured to receive the suspension atm. In another exemplary embodiment, the spindle assembly further comprises a lock-nut that may be threadably engaged with the threaded shank and rotated into forcible contact with the suspension arm, the lock-nut being configured to fixate the threaded shank and the suspension arm. In another exemplary embodiment, the threaded shank is configured with either left-hand threads or right-hand threads.

In another exemplary embodiment, the bore and the bolt are configured to mount the ball to the spindle assembly, the bolt being configured to threadably extend through suitable threaded holes in the parallel prongs and through the bore so as to fixate the ball within the recess. In another exemplary embodiment, each misalignment spacer may be threaded or press-fitted into a suitable countersunk hole in the ball. In another exemplary embodiment, the ball and the misalignment spacer disposed on each of opposite sides of the ball may be machined as a single component comprising an extended ball.

In another exemplary embodiment, the ball and the casing are comprised of stainless steel that is surface-treated with a suitable polytetrafluoroethylene (PTFE) formulation, such that the ball and the casing exhibit self-lubricating properties. In another exemplary embodiment, a lubricating race is disposed between the ball and an interior of the casing and configured to ensure sufficient lubrication is available to the ball and casing during operation. In another exemplary embodiment, the lubricating race is comprised of an injection molded Teflon impregnated Nylon race that is configured to ensure smooth and precise movement of the ball within the casing. In another exemplary embodiment, the ball and the casing are comprised of PTFE-treated stainless steel. In another exemplary embodiment, the lubricating race is comprised of a thin chamber between the ball and the interior of the casing, the thin chamber being fellable with a lubricant suitable to lubricate movement between the ball and the casing. In another exemplary embodiment, a lubrication fitting is disposed in the casing and in fluid communication with the thin camber to facilitate periodic replenishment of the lubricant within the thin chamber.

In another exemplary embodiment, the ball is comprised of 52100 bearing steel and the casing is comprised of machined 4130 chromoly. In another exemplary embodiment, the ball and the casing are heat-treated and hardchrome finished so as to improve corrosion resistance. In another exemplary embodiment, the ball and the casing are cryogenically treated to improve wear resistance.

In an exemplary embodiment, a front suspension arm that is configured to couple a front wheel with a chassis of an off-road vehicle comprises a generally wishbone-shaped member comprising an inboard end and an outboard end; one or more mounting points disposed at the inboard end and configured to couple with the chassis; a fixed end coupled with the outboard end and extending to a spindle assembly that supports the front wheel; an outboard mounting point configured to couple the fixed end and the spindle assembly; and a pivot configured to receive a strut.

In another exemplary embodiment, the front suspension arm comprises an upper suspension arm or a lower suspension arm. In another exemplary embodiment, the fixed end is comprised of a predetermined length so as to extend from the outboard end to the spindle assembly. In another exemplary embodiment, the outboard mounting point is comprised of a monoball joint configured to allow horizontal motion and vertical motion of the spindle assembly during operation of the off-road vehicle, the monoball joint comprising a ball rotatably retained within a casing; a housing comprising an opening configured to receive the casing; a bore extending through the ball and configured to receive a fastener; and a misalignment spacer disposed on each of opposite ends of the bore and configured to provide clearance for rotation of the casing on the ball.

In another exemplary embodiment, the bore and the fastener are configured to mount the ball to the spindle assembly, the fastener being configured to threadably extend through suitable threaded holes in parallel prongs of the spindle assembly and through the bore so as to fixate the ball between the parallel prongs. In another exemplary embodiment, each misalignment spacer is threaded or press-fitted into a suitable countersunk hole in the ball. In another exemplary embodiment, the ball and the misalignment spacer disposed on each of opposite sides of the ball are machined as a single component comprising an extended ball. In another exemplary embodiment, the ball and the casing are configured to exhibit self-lubricating properties.

In another exemplary embodiment, the housing comprises an opening configured to retain the casing within the housing, a rear end of the opening comprising a narrowing to prevent the casing from sliding out of the rear end, and a front end of the opening comprising a groove that receives a snap-ring that is configured to prevent the casing from exiting the front end. In another exemplary embodiment, the housing is fixedly coupled within an opening disposed in the fixed end by way of welding the housing within the opening. In another exemplary embodiment, the fixed end is a forged piece that is configured to directly receive the casing in absence of the housing. In another exemplary embodiment, the outboard mounting point comprises an opening in the fixed end that is configured to retain the casing within the fixed end, a rear end of the opening comprising a narrowing to prevent the casing from sliding out of the rear end, and a front end of the opening comprising a groove that receives a snap-ring that is configured to prevent the casing from exiting the front end.

In another exemplary embodiment, any one or more of the one or more mounting points is comprised of a rod-end joint configured to allow substantially vertical motion of the suspension arm due to operation of the off-road vehicle, the rod-end joint comprising a ball rotatably retained within a casing; a bore extending through the ball and configured to receive a bolt that is configured to fixate the ball between parallel prongs of the chassis; a threaded shank fixedly coupled with the casing and configured to be received by any one of the one or more mounting points; and a misalignment spacer disposed on each of opposite sides of the ball and configured to provide clearance for rotation of the casing on the ball.

In another exemplary embodiment, a weld-in tube end is coupled with the casing in lieu of the threaded shank and configured to be received by any one of the one or more mounting points. In another exemplary embodiment, the threaded shank further comprises a lock-nut that may be threadably engaged with the threaded shank and rotated into forcible contact with any one of the one or more mounting points, the lock-nut being configured to fixate the threaded shank and the any one of the one or more mounting points. In another exemplary embodiment, the threaded shank is configured with either left-hand threads or right-hand threads. In another exemplary embodiment, the rod-end joint is configured to facilitate adjusting at least a camber angle and a caster angle of the front wheel.

BRIEF DESCRIPTION OF THE DRAWINGS

The drawings refer to embodiments of the present disclosure in which:

FIG. 4A illustrates a front plan view of an exemplary embodiment of rod-end joint coupling a spindle assembly with a suspension arm;

FIG. 4B illustrates a side plan view of the rod-end joint of FIG. 4A;

FIG. 5 illustrates a perspective view of an exemplary embodiment of rod-end joint that includes a lubricating race and a lubrication fitting;

FIG. 6A illustrates an isometric view of an exemplary embodiment of a monoball front suspension that is configured to couple the front wheel with a driver side of the off-road vehicle;

Figure 1:
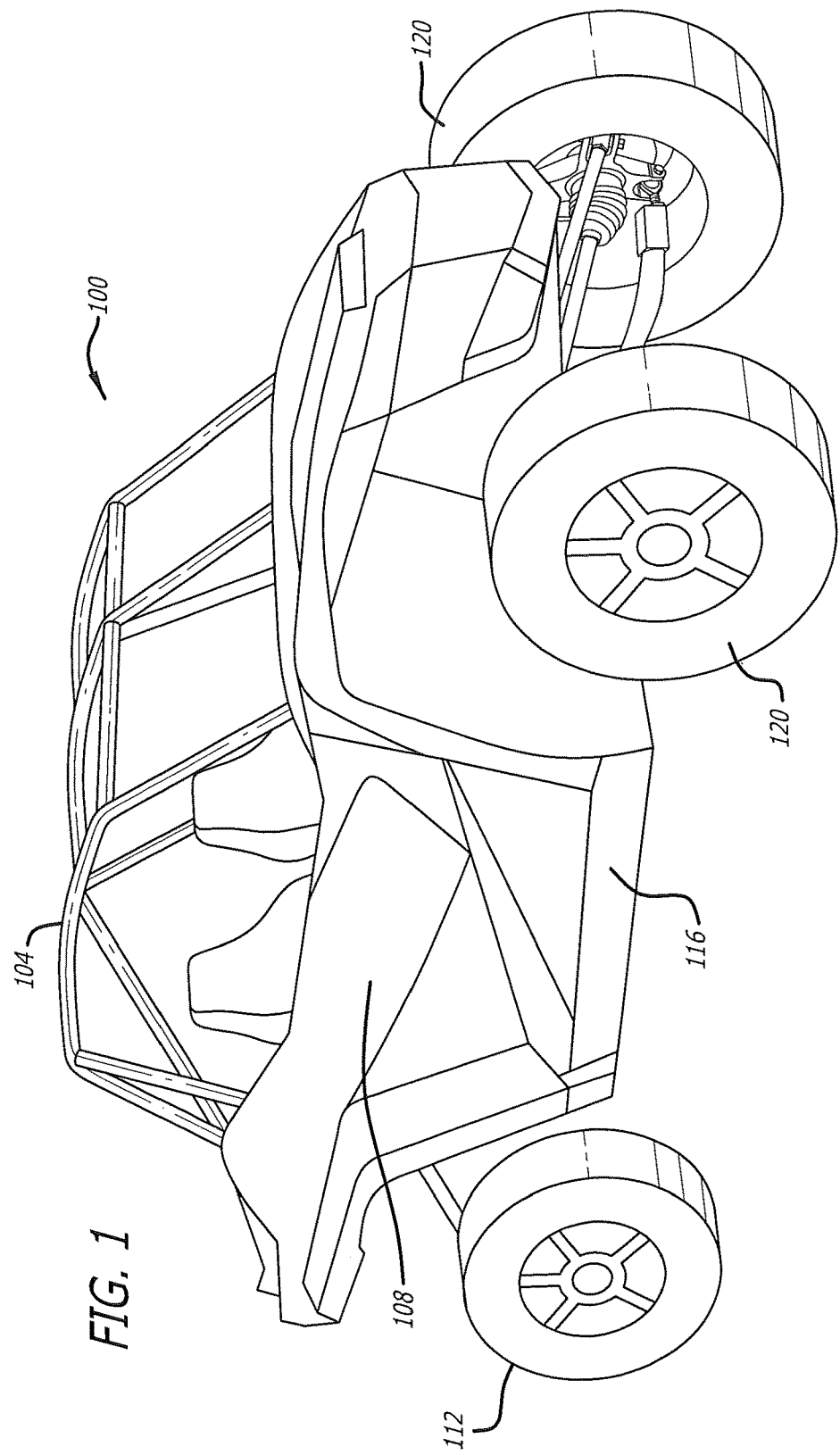
FIG. 1 illustrates an exemplary embodiment of an off-road vehicle that is particularly suitable for implementation of an off-road front suspension system in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first joint," may be made. However, the specific numeric reference should not be interpreted as a literal sequential order but rather interpreted that the "first joint" is different than a "second joint." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes a suspension for coupling a front wheel with a chassis of an off-road vehicle. The suspension comprises an upper suspension arm that includes two inboard mounting points to the chassis and one outboard rod-end joint to a spindle assembly coupled with the front wheel. A lower suspension arm comprises two inboard mounting points to the chassis and one outboard rod-end joint to the spindle assembly. Each outboard rod-end joint is comprised of a ball that is rotatable within a casing that is threadably coupled with each of the upper and lower suspension arms. A bolt fastens each of the balls between a pair of parallel prongs extending from the spindle assembly, such that the upper and lower suspension arms may pivot with respect to the spindle assembly during vertical motion of the spindle assembly, as well as during horizontal rotation of the spindle assembly due to steering. A strut comprising a shock absorber and a coil spring is coupled between the lower suspension arm and the chassis. The upper suspension arm is configured to facilitate coupling the strut between the lower suspension arm and the chassis. A steering rod is coupled with the spindle assembly by way of a steering rod-end joint that is disposed at a front of the spindle assembly. The steering rod-end joint is comprised of a ball that is rotatable within a casing that is threadably coupled with the steering rod. A pair of parallel prongs and a bolt hingedly couple the steering rod-end with the spindle assembly, such that the steering rod-end joint allows vertical and horizontal rotational motion of the spindle assembly during operation of the off-road vehicle. The steering rod-end joint is coupled with the spindle assembly forward of a drive axle, thereby decreasing leverage of the front wheel on the steering rod and substantially eliminating bump steer that may occur due to rough terrain.

FIG. 1 shows an off-road vehicle 100 that is particularly suitable for implementation of an off-road front suspension system in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system. Front wheels 120 may be operably coupled with the chassis 116 by way of the front suspension system disclosed herein. It should be understood, however, that the front suspension system of the present disclosure is not to be limited to the off-road vehicle 100, but rather the front suspension system may be incorporated into a wide variety of off-road vehicles, other than UTVs, without limitation.

Figure 2:
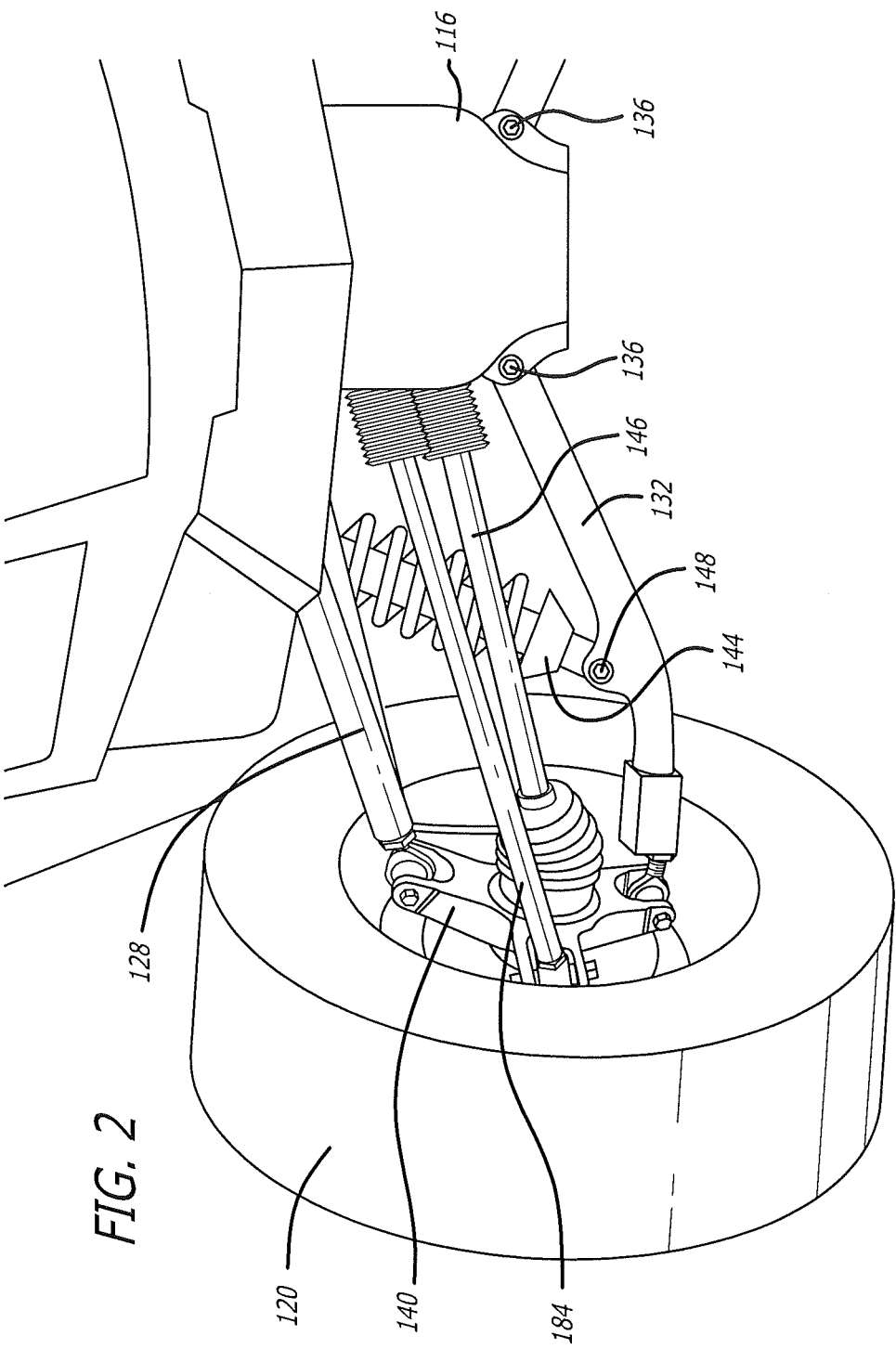
FIG. 2 illustrates a front view of a front suspension system that is configured to couple a front wheel with a passenger side of an off-road vehicle.

FIG. 2 illustrates a front view of a front suspension system 124 that is configured to couple the front wheel 120 with a passenger side of the off-road vehicle 100. The front suspension system 124 is comprised of an upper suspension arm 128 and a lower suspension arm 132 that couple the front wheel 120 with the chassis 116. Each of the upper and lower suspension arms 128, 132 comprises two inboard mounting points 136 to the chassis 116 and one outboard mounting joint to a spindle assembly 140. As will be recognized, the upper and lower suspension arms 128, 132 generally are of a double wishbone variety of suspension that facilitates controlling various parameters affecting the orientation of the wheel 120 with respect to the off-road vehicle 100, such as, by way of non-limiting example, camber angle, caster angle, toe pattern, roll center height, scrub radius, and scrub.

It should be understood that although the front suspension system 124 is disclosed specifically in connection with the passenger side of the off-road vehicle 100, a driver side front suspension system is to be coupled with a driver side of the off-road vehicle. It should be further understood that the driver side front suspension system is substantially identical to the front suspension system 124, with the exception that the driver side front suspension system is configured specifically to operate with the driver side of the off-road vehicle 100. As will be appreciated, therefore, the driver side front suspension system and the front suspension system 124 may be configured as reflections of one another across a longitudinal midline of the off-road vehicle 100.

As shown in FIG. 2, a strut 144 that is comprised of a shock absorber and a coil spring is mounted to the lower suspension arm 132 by way of a lower pivot 148. An upper pivot (not shown) couples a top of the strut 144 to the chassis 116. The strut 144 is configured to control vertical motion of the front suspension system 124 due to movement of the front wheel 120 as the off-road vehicle 100 travels over bumpy terrain. The upper suspension arm 128 may be suitably configured, such as in the form of a J-arm, so as to facilitate coupling the strut 144 between the lower suspension arm 132 and the chassis 116 in lieu of being coupled between the upper suspension arm and the chassis.

In some embodiments, coupling the strut 144 with the lower suspension arm 132 positions the strut at between 8 inches and 10 inches lower, with respect to the chassis 116, than the position of the strut when coupled with the upper suspension arm 128. Experimental observation has shown that the lower position of the strut 144 generally facilitates a lower center of gravity of the off-road vehicle 100 and a relatively smaller shock angle, as well as eliminating a need for extending the strut towers through and above a hood of the off-road vehicle 100. In one embodiment, the coupling of the strut 144 with the lower suspension arm 132 positions the strut at substantially 90-degrees with respect to the lower pivot 148 and the upper pivot during full compression of the strut.

Figure 3:
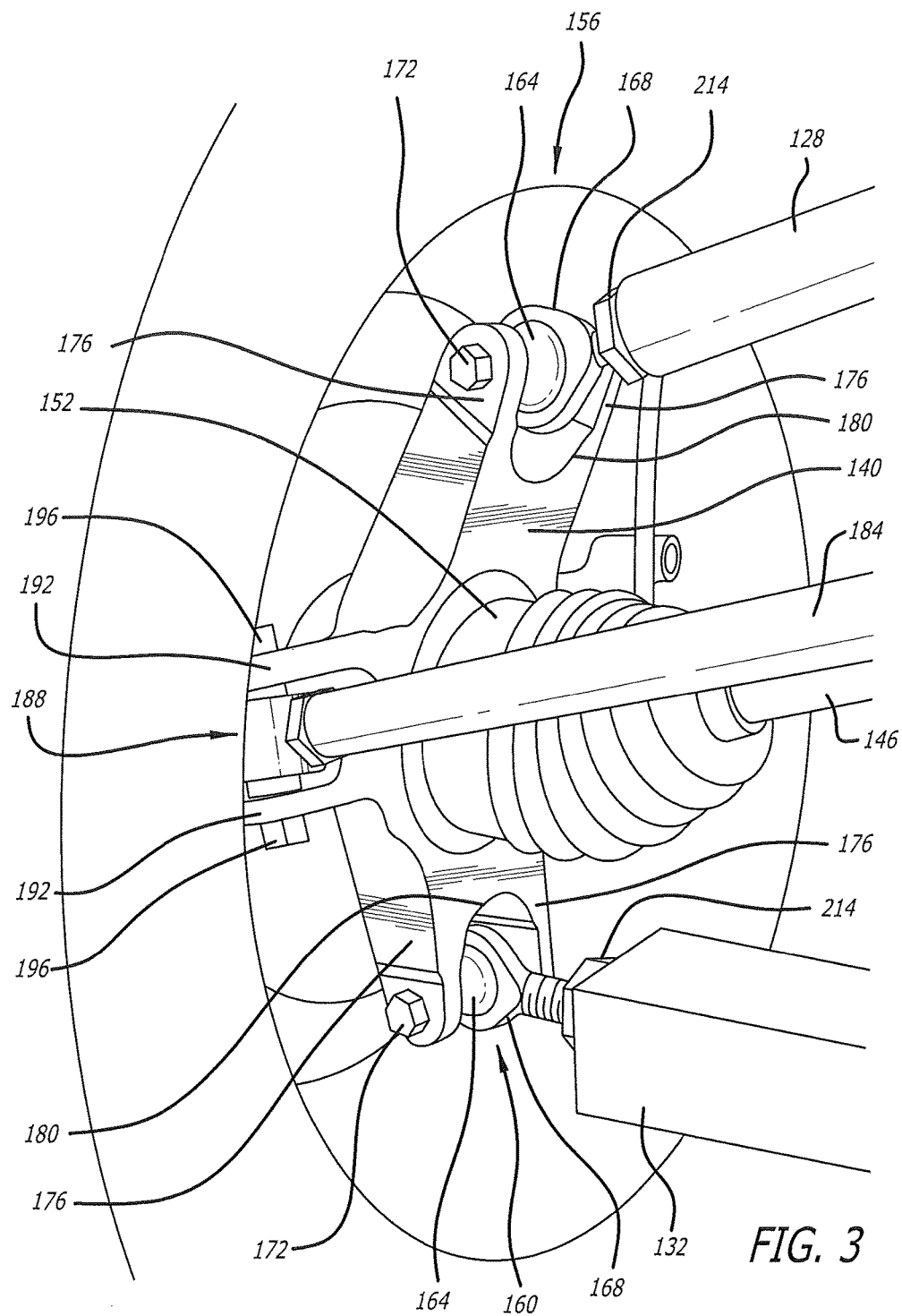
FIG. 3 illustrates a front view of an exemplary embodiment of outboard rod-end joints coupling a spindle assembly with upper and lower suspension antis.

As shown in FIG. 2, a drive axle 146 is coupled between a transaxle and the front wheel 120. The drive axle 146 is configured to conduct torque from the transaxle to the front wheel 120 and accommodate vertical pivoting motion of the front suspension assembly 124 in response to road conditions. As best shown in FIG. 3, the drive axle 146 is comprised of a constant velocity (CV) joint 152 that is coupled with the spindle assembly 140 onto which the front week is mounted. The CV joint 152 allows uninterrupted torque transmission from the transaxle to the front wheel 120 during vertical pivoting of the front suspension assembly 124 due to road conditions. As will be appreciated, the spindle assembly 140 generally supports the CV joint 152 and the front wheel 120 by way of one or more roller bearings (not shown).

As further shown in FIG. 3, the spindle assembly 140 is pivotally coupled with the upper and lower suspension arms 128, 132. An upper rod-end joint 156 couples the upper suspension arm 128 to the spindle assembly 140, and a lower rod-end joint 160 couples the lower suspension arm 132 to the spindle assembly. Preferably, the upper and lower rod-end joints 156, 160 are of a Heim-joint variety, wherein each of the joints is comprised of a ball 164 that is movable within a casing 168 that is threadably coupled with each of the suspension arms 128, 132. A bolt 172 fastens each of the balls 164 between a pair of parallel prongs 176 extending from the spindle assembly 140. It is contemplated that a recess 180 disposed between each pair of parallel prongs 176 has a shape and a size that are suitable to fixedly receive the ball 164 and allow for a desired degree of movement of the casing 168 on the ball. Thus, during vertical motion of the spindle assembly 140, as well as during horizontal rotation of the spindle assembly 140 due to steering, the balls 164 rotate within their respective casings 168, allowing the upper and lower suspension arms 128, 132 to pivot with respect to the spindle assembly 140.

Upon inspection of FIG. 3, it will be recognized that the upper and lower rod-end joints 156, 160 are similar to Clevis fasteners. For example, each pair of parallel prongs 176 is similar to a Clevis, the bolt 172 is similar to a Clevis pin, and the ball 164 and casing 168 are similar to a tang. As such, each of the upper and lower rod-end points 156, 160 provides two shear planes that may withstand twice the incident force that may be withstood by single shear joints that are used in conventional front suspensions.

In the embodiment illustrated in FIG. 3, a steering rod 184 couples the spindle assembly 140 with a steering system of the off-road vehicle 100. The steering rod 184 is coupled with the spindle assembly 140 by way of a rod-end joint 188 that is similar to the upper and lower rod-end joints 156, 160. It is contemplated, therefore, that the rod-end joint 188 may be of the Heim-joint variety or may be of a bushing variety, as desired. A pair of parallel prongs 192 and a bolt 196 hingedly couple the steering rod 184 with the spindle assembly 140. As will be appreciated, the rod-end joint 188 allows vertical and horizontal rotational motion of the spindle assembly 140 during operation of the off-road vehicle 100. Further, the rod-end joint 188 is coupled with the spindle assembly 140 forward of the drive axle 146, thereby providing a front steering system to the off-road vehicle 100. Experimentation has demonstrated that the front steering system shown in FIG. 3 advantageously decreases leverage of the front wheel 120 on the rod-end joint 188 and the steering rod 184, thereby substantially eliminating bump steer that may occur due to forces exerted on the front wheel by rough terrain.

FIGS. 4A-4B illustrate an exemplary embodiment of a rod-end 200 that may be pivotally coupled with either of the upper and lower suspension arms 128, 132 of the spindle assembly 140, as described herein. Like the rod-end joints 156, 160, the rod-end 200 is generally of the Heim-joint variety. The rod-end 200 is comprised of a ball 204 that is retained within a casing 208, such that the ball 204 may be rotated within the casing 208. A threaded shank 212, or a weld-in tube end, is fixedly coupled with the casing 208 so as to enable coupling the rod-end to one of the suspension arms 128, 132. The threaded shank 212 may be fixedly coupled with the suspension atm by way of a lock-nut 214 that may be threaded onto the shank 212 and rotated into forcible contact with the suspension arm. It is contemplated that the threaded shank 212 may be configured with left-hand threads or right-hand threads, without limitation.

A bore 216 extends through the ball 204 and is configured to receive the bolt 172. The bore 216 and the bolt 172 facilitate mounting the rod-end 200 to the spindle assembly 140. In particular, the bolt 172 may be passed through suitable threaded holes in the prongs 176 and through the bore 216 so as to fixate the ball 204 in the recess 180. With the ball 204 fixated between the parallel prongs 176, the casing 208 and the suspension arm to which the rod-end 200 is fastened may be freely moved with respect to the spindle assembly 140.

As best shown in FIG. 4B, a misalignment spacer 220 may be disposed on each of opposite sides of the ball 204. The misalignment spacers 220 ensure that the ball 204 remains centered within the recess 180, between the parallel prongs 176, while providing a relatively high degree of clearance for rotation of the casing 208 on the ball 204. In some embodiments, the misalignment spacers 220 may be threaded or press-fitted into suitable countersunk holes in the ball 204. In some embodiments, the ball 204 and the misalignment spacers 220 may be machined as a single component comprising an extended ball that may be installed into the casing 208 during manufacturing of the rod-end 200.

In some embodiments, a lubricating race may be incorporated into the rod-end as to ensure sufficient lubrication is available to the ball and casing during operation of the rod-end. For example, in an exemplary embodiment of a rod-end 224, illustrated in FIG. 5, a lubricating race 228 is disposed between the ball 204 and an interior of the casing 208. In some embodiments, the lubricating race 228 may be comprised of a heavy duty, injection molded Teflon impregnated Nylon race that is configured to ensure smooth and precise movement of the ball 204 within the casing 208. In some embodiments, the lubricating race 228 may be comprised of a thin chamber between the ball 204 and an interior of the casing 208. A suitable lubricant, such as a high-quality grease, may be disposed within the thin chamber so as to lubricate movement between the ball 204 and the casing 208. A lubrication fitting 232 may be disposed in the casing 208 and in fluid communication with the thin camber to facilitate periodic replenishment of the lubricant within the thin chamber.

In some embodiments, the rod-ends 200, 224 may be configured to have self-lubricating properties. For example, in some embodiments, the balls and casings 204, 208 may be comprised of stainless steel that is treated with polytetrafluoroethylene (PTFE). It is contemplated that any of various PTFE-based formulations may be applied to the rod-ends 200, 224, without limitation. In some embodiments, PTFE-treated stainless steel balls and casings 204, 208 may be coupled with a lubricating race 228 that is comprised of an injection molded Teflon impregnated Nylon race, without limitation.

It is contemplated that the rod-ends 200, 224 may be treated during manufacturing so as to optimize hardness, strength, durability, and longevity. In some embodiments, the casings 208 may be machined 4130 chromoly or any suitable material, and the balls 204 may be comprised of 52100 bearing steel or any suitable material. The balls and casings 204, 208 may be heat-treated and hard-chrome finished so as to improve strength and corrosion resistance. Further, the balls and casings 204, 208, as well as the race 228, may be cryogenically treated to improve hardness, durability, and wear resistance.

Figure 6B:
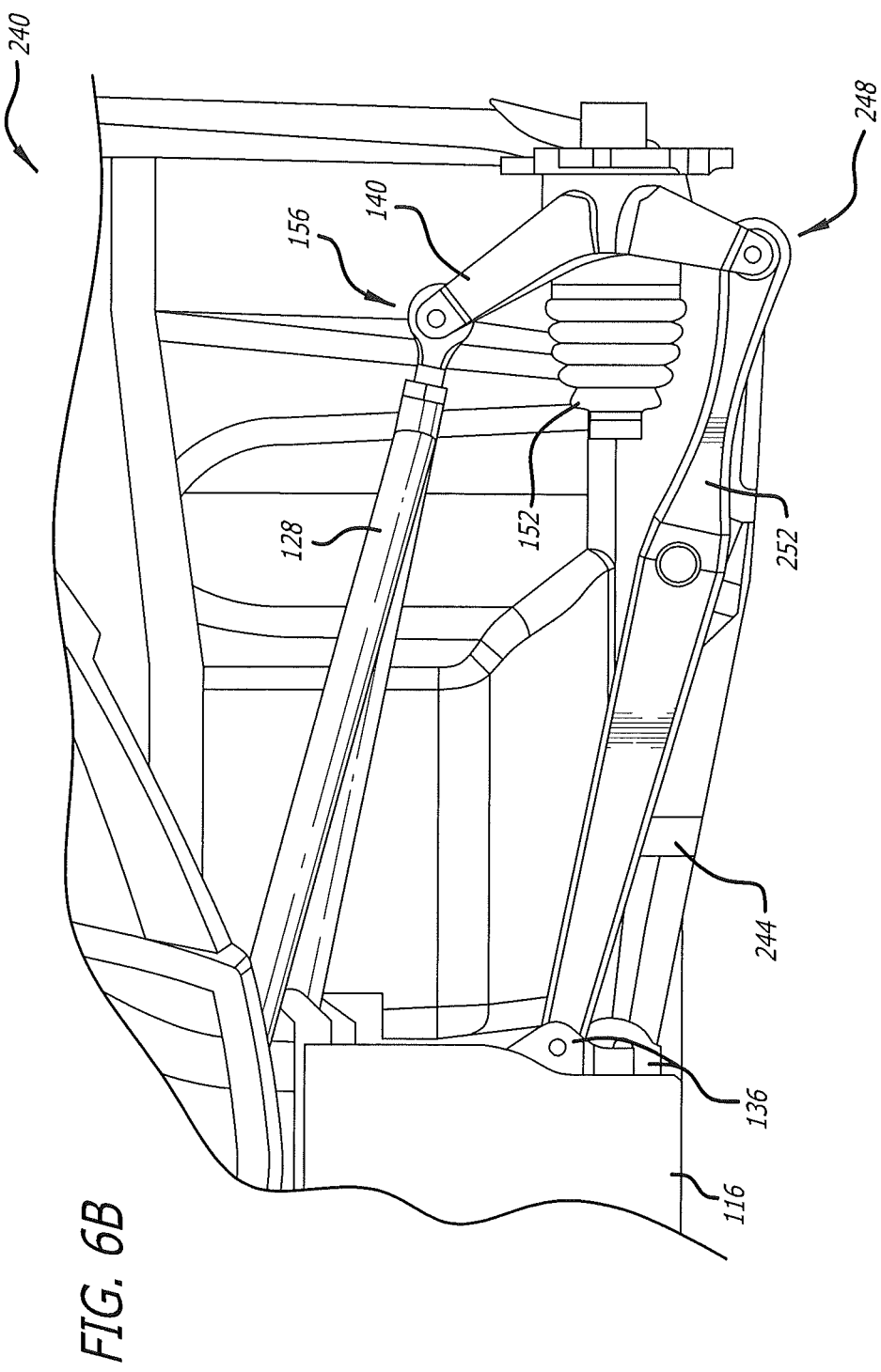
FIG. 6B illustrates a front plan view of the monoball front suspension shown in FIG. 6A.

FIGS. 6A-6B illustrate an exemplary embodiment of a monoball front suspension 240 that is configured to couple the front wheel 120 with a driver side of the off-road vehicle 100. Similar to the front suspension 124, illustrated in FIG. 2, the monoball front suspension 240 is comprised of an upper suspension arm 128 and a lower suspension atm 244 that couple the front wheel 120 with the chassis 116. Each of the upper and lower suspension arms 128, 244 comprises two inboard mounting points 136 to the chassis 116 and one outboard mounting joint to a spindle assembly 140. The upper and lower suspension arms 128, 244 generally are of a double wishbone variety of suspension that facilitates controlling various parameters affecting the orientation of the wheel 120 with respect to the off-road vehicle 100, such as camber angle, caster angle, toe pattern, roll center height, scrub radius, and scrub.

As best shown in FIG. 6A, the spindle assembly 140 is pivotally coupled with the upper and lower suspension arms 128, 244. An upper rod-end joint 156 couples the upper suspension atm 128 to the spindle assembly 140, and a lower monoball joint 248 couples the lower suspension arm 244 to the spindle assembly. The upper rod-end joint 156 and the lower monoball joint 248 allow vertical motion of the spindle assembly 140 during traveling over terrain, and horizontal rotation of the spindle assembly 140 during steering of the off-road vehicle 100.

The lower suspension arm 244 is comprised of a fixed end 252 that supports the lower monoball joint 248, and thus the lower suspension arm generally is of a fixed length. The fixed end 252 may be configured to receive a monoball assembly, as described herein, or may be a forged piece that directly receives a monoball. It should be recognized that the fixed end 252 is not limited to the lower suspension arm 244, but rather, in some embodiments, the upper suspension arm 128 may be comprised of a fixed end and an upper monoball joint, in lieu of the rod-end joint 156. Incorporating the fixed end 252 into either, or both, of the upper and lower arms 128, 244 has been found to simplify manufacturing of the off-road vehicle 100, reduce manufacturing costs, and generally prevent end-users of the off-road vehicle 100 from altering factory settings.

FIGS. 7A-8B illustrate an exemplary embodiment of a monoball assembly 260 that may be incorporated into the lower monoball joint 248, as well as a similar upper monoball joint, as described with respect to FIGS. 6A-6B. The monoball assembly 260 is substantially similar to the rod-end 200, and thus the monoball assembly is generally of the Heim-joint variety. The monoball assembly 260 is comprised of a ball 204 that is retained within a casing 208, such that the ball 204 may be rotated within the casing 208. It is contemplated that sufficient lubrication may be made available to the ball 204 and casing 208 to ensure advantageous operation of the monoball assembly 260, as described herein.

Figure 7A:
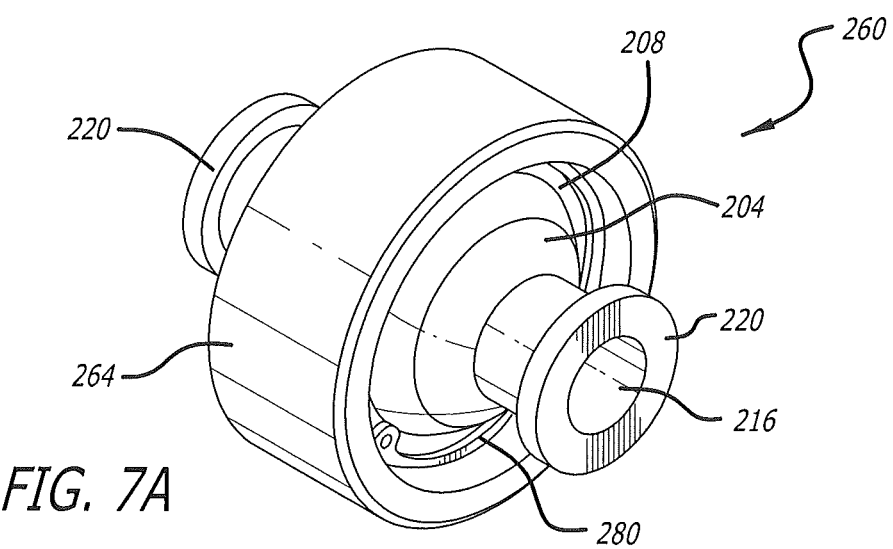
FIG. 7A illustrates an isometric view of an exemplary embodiment of a monoball assembly.
Figure 7B:
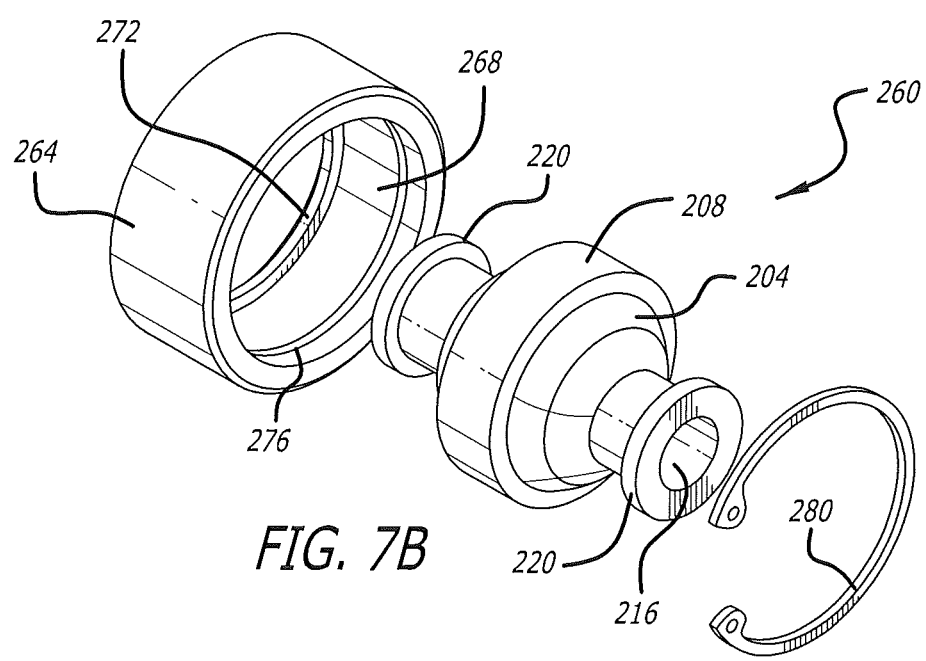
FIG. 7B illustrates an exploded isometric view of the monoball assembly of FIG. 7A.

In the embodiment illustrated in FIG. 7B, a housing 264 comprising an opening 268 is configured to receive the casing 208, such that the ball 204 may be rotated with respect to the housing 264. The housing 264 may be fixedly coupled with the lower suspension arm 244, such as, by way of example, welding the housing within the fixed end of the suspension arm. In some embodiments, however, the fixed end 252 may be a forged piece that is configured to directly receive the casing 208 in absence of the housing 264. For example, in such embodiments, the fixed end 252 may include an opening, similar to the opening 268, that retains the casing 208 within the fixed end. Once the monoball assembly 260 is coupled with the fixed end 252, the ball 204 may be rotated with respect to the suspension arm to which the fixed end is coupled, such as the lower suspension arm 244. Further, in some embodiments, wherein the upper suspension arm 128 is comprised of a fixed end, similar to the fixed end 252, the monoball assembly 260 may be coupled with the upper suspension arm, as described herein.

As further shown in FIG. 7B, a backstop 272 is disposed at a rear end of the opening 268. The backstop 272 comprises a narrowing of the opening 268 that serves to prevent the casing 208 from sliding out of the rear end of the opening 268. A groove 276 disposed at a front end of the opening 268 is configured to receive a suitably-sized snap-ring 280. Once installed into the groove 276, the snap-ring 280 prevents the casing 208 from exiting the front end of the opening 268. Thus, the backstop 272, the groove 276, and the snap-ring 280 cooperate to retain the casing 208 within the housing 264, as shown in FIG. 7A. It is contemplated, however, that in those embodiments wherein the fixed end 252 is a forged piece, as described above, the opening within the fixed end may include a backstop and a groove that receives the snap-ring 280 so as to retain the housing 264 within the fixed end 252, as shown in FIG. 6A.

Similar to the rod-end 200, the monoball assembly 260 comprises a bore 216 that extends through the ball 204. The bore 216 is configured to receive the bolt 172, shown in FIG. 3, to facilitate mounting the monoball assembly 260 to the spindle assembly 140. As discussed with respect to FIG. 3, the bolt 172 may be passed through suitable threaded holes in the prongs 176 and through the bore 216 so as to fixate the ball 204 in the recess 180. With the ball 204 fixated between the parallel prongs 176, the spindle assembly 140 may be freely moved with respect to the suspension arm to which the monoball assembly 260 is coupled.

Figure 8A:
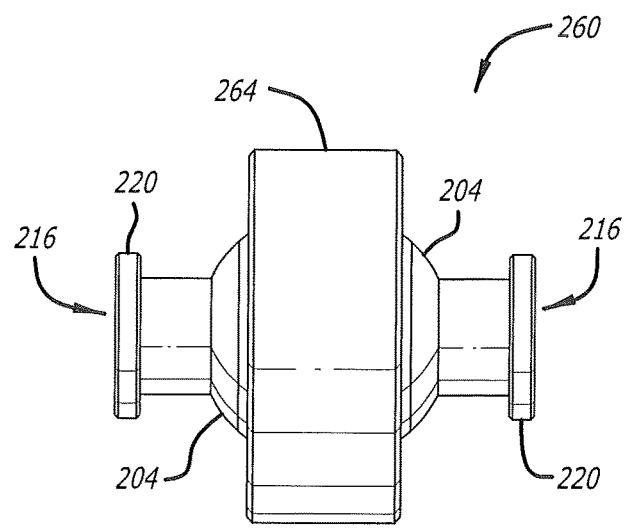
FIG. 8A illustrates a side plan view of the monoball assembly of FIG. 7A.
Figure 8B:
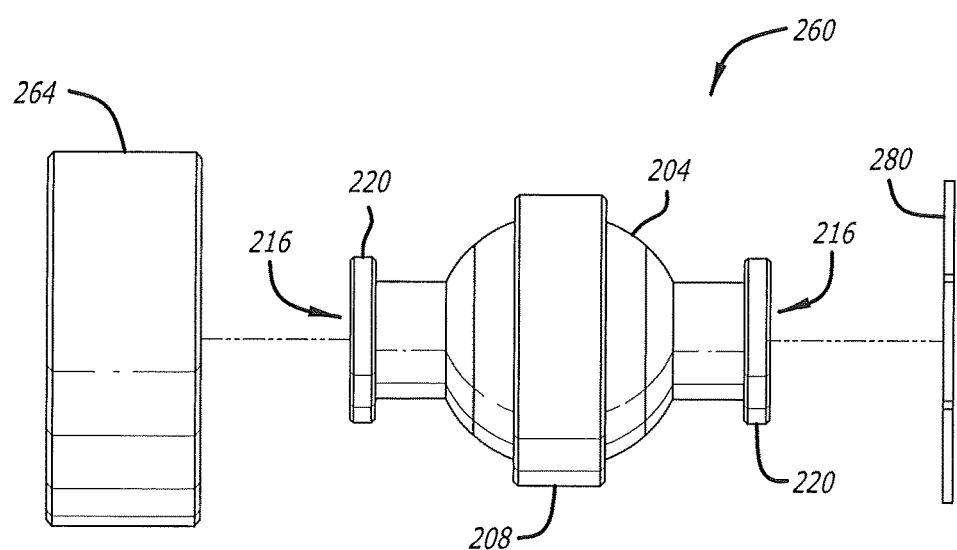
FIG. 8B illustrates an exploded side plan view of the monoball assembly of FIG. 8A.

As best shown in FIGS. 8A-8B, a misalignment spacer 220 may be disposed on each of opposite sides of the ball 204. The misalignment spacers 220 ensure that the ball 204 remains centered within the recess 180, between the parallel prongs 176, while providing a relatively high degree of clearance for rotation of the ball 204 within the casing 208. In some embodiments, the misalignment spacers 220 may be threaded or press-fitted into suitable countersunk holes in the ball 204. In some embodiments, the ball 204 and the misalignment spacers 220 may be machined as a single component comprising an extended ball that may be installed into the casing 208 during manufacturing of the monoball assembly 260.

It is contemplated that in some embodiments, a lubricating race may be incorporated into the monoball assembly 260 to ensure sufficient lubrication is available to the ball 204 and casing 208 during operation of the monoball assembly. For example, in some embodiments, a lubricating race, similar to the lubricating race 228, may be configured to ensure smooth and precise movement of the ball 204 within the casing 208. In some embodiments, a thin chamber may be disposed between the ball 204 and an interior of the casing 208. A suitable lubricant, such as a high-quality grease, may be disposed within the thin chamber to lubricate movement between the ball 204 and the casing 208.

Moreover, in some embodiments, the monoball assembly 260 may be configured to have self-lubricating properties. For example, the ball and casing 204, 208 may be comprised of stainless steel that is treated with PTFE. It is contemplated that any of various PTFE-based formulations may be applied to the monoball assembly 260, without limitation. In some embodiments, PTFE-treated stainless steel balls and casings 204, 208 may be coupled with a lubricating race that is comprised of an injection molded Teflon impregnated Nylon race, without limitation.

It is further contemplated that the monoball assembly 260 may be treated during manufacturing so as to optimize hardness, strength, durability, and longevity. In some embodiments, for example, the casing 208 may be machined 4130 chromoly, or any suitable material, and the ball 204 may be comprised of 52100 bearing steel, or any suitable material. The ball and casing 204, 208 may be heat-treated and hard-chrome finished so as to improve strength and corrosion resistance, and the ball and casing 204, 208 may be cryogenically treated to improve hardness, durability, and wear resistance.

Although the monoball assembly 260 and the rod-ends 200, 224, have been discussed with respect to upper and lower outboard joints between the spindle assembly 140 and the suspension arms 128, 132, the monoball assembly 260 and the rod-ends 200, 224 are not to be limited to being implemented in outboard joints. For example, in some embodiments, any of the inboard joints 136 may be comprised of rod-end joints that are substantially similar to the upper and lower rod-end joints 156, 160. Further, in some embodiments, any of outboard joints 156, 160 may be comprised of monoball assemblies 260 and the inboard joints 136 may be comprised of rod-ends 200, 224. It is contemplated that incorporating the rod-ends 200, 224 into the inboard joints 136, in lieu of bushing-type joints, advantageously facilitates adjusting at least the camber angle and the caster angle of the wheels 120.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A front suspension arm that is configured to couple a front wheel with a chassis of an off-road vehicle, comprising:
   a wishbone-shaped member comprising an inboard end and an outboard end;
   an outboard mounting point configured to couple a fixed end and a spindle assembly that supports the front wheel, wherein the outboard mounting point is comprised of a monoball joint configured to allow horizontal motion and vertical motion of the spindle assembly during operation of the off-road vehicle, the monoball joint comprising:
      a ball rotatably retained within a casing;
      a housing comprising an opening configured to receive the casing;
      a bore extending through the ball and configured to receive a fastener; and
      a first pair of misalignment spacers, wherein one of the first pair of misalignment spacers is disposed on each of opposite ends of the bore and configured to provide clearance for rotation of the casing on the ball; and
   a pivot configured to receive a strut, wherein the fastener is configured to threadably extend through threaded holes in parallel prongs of the spindle assembly and the bore to fixate the ball between the parallel prongs.

2. The front suspension arm of claim 1, wherein the front suspension arm comprises an upper suspension arm or a lower suspension arm.

3. The front suspension arm of claim 1, wherein the fixed end is comprised of a predetermined length so as to extend from the outboard end to the spindle assembly.

4. The front suspension arm of claim 1, wherein each misalignment spacer of the first pair of misalignment spacers is threaded or press-fitted into a suitable countersunk hole in the ball.

5. The front suspension arm of claim 1, wherein the ball and the first pair of misalignment spacers are machined as a single component comprising an extended ball.

6. The front suspension arm of claim 1, wherein the ball and the casing are configured to exhibit self-lubricating properties.

7. The front suspension arm of claim 1, wherein the housing comprises an opening configured to retain the casing within the housing, a rear end of the opening comprising a narrowing to prevent the casing from sliding out of the rear end, and a front end of the opening comprising a groove that receives a snap-ring that is configured to prevent the casing from exiting the front end.

8. The front suspension arm of claim 7, wherein the housing is fixedly coupled within an opening disposed in the fixed end by way of welding the housing within the opening.

9. The front suspension arm of claim 1, wherein the fixed end is a forged piece that is configured to directly receive the casing in absence of the housing.

10. The front suspension arm of claim 1, wherein the outboard mounting point comprises an opening in the fixed end that is configured to retain the casing within the fixed end, a rear end of the opening comprising a narrowing to prevent the casing from sliding out of the rear end, and a front end of the opening comprising a groove that receives a snap-ring that is configured to prevent the casing from exiting the front end.

11. The front suspension arm of claim 1, further comprising:
one or more mounting points disposed at the inboard end and configured to couple with the chassis, wherein any one or more of the one or more mounting points is comprised of a rod-end joint configured to allow substantially vertical motion of the suspension arm due to operation of the off-road vehicle, the rod-end joint comprising:
a second ball rotatably retained within a second casing;
a second bore extending through the second ball and configured to receive a second bolt that is configured to fixate the second ball between a second set of parallel prongs;
a threaded shank fixedly coupled with the second casing and configured to be received by any one of the one or more mounting points; and
a second pair of misalignment spacers, wherein one of the second pair of misalignment spacers is disposed on each of opposite sides of the second ball and configured to provide clearance for rotation of the second casing on the second ball.

12. The front suspension arm of claim 11, wherein a weld-in tube end is coupled with the second casing and configured to be received by any one of the one or more mounting points.

13. The front suspension arm of claim 11, further comprising a lock-nut that may be threadably engaged with the threaded shank and rotated into forcible contact with any one of the one or more mounting points, the lock-nut being configured to fixate the threaded shank and the any one of the one or more mounting points.

14. The front suspension arm of claim 11, wherein the threaded shank is configured with either left-hand threads or right-hand threads.

15. The front suspension arm of claim 14, wherein the rod-end joint is configured to facilitate adjusting at least a camber angle and a caster angle of the front wheel.

16. A suspension arm that is configured to couple a wheel with a chassis of an off-road vehicle, comprising:
a member comprising an inboard end and an outboard end; and
an outboard mounting point configured to couple the fixed end and a spindle assembly that supports the wheel, wherein the outboard mounting point is comprised of a monoball joint configured to allow horizontal motion and vertical motion of the spindle assembly during operation of the off-road vehicle, the monoball joint comprising:
a ball rotatably retained within a casing;
a housing comprising an opening configured to receive the casing;
a bore extending through the ball and configured to receive a fastener; and
a misalignment spacer disposed on each of opposite ends of the bore and configured to provide clearance for rotation of the casing on the ball,
wherein the housing comprises an opening configured to retain the casing within the housing, a rear end of the opening comprising a narrowing to prevent the casing from sliding out of the rear end, and a front end of the opening comprising a groove that receives a snap-ring that is configured to prevent the casing from exiting the front end.

17. The suspension arm of claim 16, wherein the suspension arm is an upper suspension arm or a lower suspension arm.

18. The suspension arm of claim 16, wherein the fixed end is comprised of a predetermined length so as to extend from the outboard end to the spindle assembly.

* * * * *